United States Patent
Zeng et al.

(10) Patent No.: US 9,341,524 B2
(45) Date of Patent: May 17, 2016

(54) STRESS DETECTION DEVICE FOR LIGHT-TRANSMISSIVE STRUCTURE AND STRESS DETECTION METHOD FOR THE SAME

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Zhihui Zeng, Beijing (CN); Fang Liu, Beijing (CN); Hongbo Feng, Beijing (CN); Yuefeng Su, Beijing (CN); Ruijun Dong, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 14/525,707

(22) Filed: Oct. 28, 2014

(65) Prior Publication Data

US 2015/0377722 A1 Dec. 31, 2015

(30) Foreign Application Priority Data

Jun. 26, 2014 (CN) .......................... 2014 1 0295714

(51) Int. Cl.
*G01B 11/16* (2006.01)
*G01L 1/24* (2006.01)

(52) U.S. Cl.
CPC ................ *G01L 1/24* (2013.01); *G01B 11/168* (2013.01)

(58) Field of Classification Search
CPC ... G01B 11/16; G01N 21/1702; G01N 11/16; G01N 21/211; G01N 2203/0051; G01N 2203/0286; G01N 2203/0623; G01N 3/24; G01N 29/0681; G01N 29/2418; G01N 2291/02827; G01N 2021/1725; G01N 2291/0427; G01N 21/21
See application file for complete search history.

(56) References Cited

U.S. PATENT DOCUMENTS

| | | | |
|---|---|---|---|
| 6,219,131 B1 | 4/2001 | Zhang et al. | |
| 2013/0250277 A1* | 9/2013 | Wang ........................ | G01L 1/24 356/33 |

FOREIGN PATENT DOCUMENTS

| | | |
|---|---|---|
| CN | 2713464 Y | 7/2005 |
| CN | 201503391 U | 6/2010 |
| CN | 103552225 A | 2/2014 |
| DE | 10310837 A1 | 4/2005 |

* cited by examiner

OTHER PUBLICATIONS

First Office Action regarding Chinese application No. 201410295714.X, dated Nov. 26, 2015. Translation provided by Dragon Intellectual Property Law Firm.

*Primary Examiner* — Michael P Stafira
(74) *Attorney, Agent, or Firm* — Harness, Dickey & Pierce, P.L.C.

(57) ABSTRACT

A stress detection device and a detection method for a light-transmissive structure are disclosed. The stress detection device for a light-transmissive structure comprises: a light source, a first polarizer, a light intensity distribution state detection unit and a stress distribution state analysis unit; wherein the light source emits uniform polarized light; during detection, the first polarizer and the light sources are located at opposite sides of the light-transmissive structure, respectively; the light intensity distribution state detection unit is configured to obtain a light intensity distribution state of the polarized light emitted from the first polarizer; the stress distribution state analysis unit is configured to obtain a stress distribution state of the light-transmissive structure according to the light intensity distribution state.

16 Claims, 3 Drawing Sheets

STRESS DETECTION DEVICE FOR LIGHT-TRANSMISSIVE STRUCTURE AND STRESS DETECTION METHOD FOR THE SAME

CROSS-REFERENCE TO RELATED APPLICATION

This disclosure claims priority to Chinese Patent Application No. 201410295714.X filed on Jun. 26, 2014, the disclosures of which are incorporated in their entirety by reference herein.

TECHNICAL FIELD

The present disclosure relates to the field of display technology, more particularly to a stress detection device for a light-transmissive structure and a stress detection method for the light-transmissive structure.

BACKGROUND

A liquid crystal display (LCD) is a super-thin plane display apparatus, including a plurality of light-transmissive structures, such as a light guide plate, a glass substrate or the like. There exist stresses within these light-transmissive structures. These stresses can cause a variety of poor displays to appear on the LCD, even cause the LCD to be bent or broken.

Typically, these stresses are generated in a process of manufacturing the light-transmissive structure. For example, the process of manufacturing the light guide plate is as follows: heating a material of the light guide plate to be in a molten state, then injecting the material into a light guide plate mold, after cooling and plasticizing the material, obtaining the light guide plate with a specific shape. In the process of manufacturing the light guide plate, since the material of the light guide plate in the molten state has fluidity, there inevitably exist stresses within the light guide plate in the process of cooling and plasticizing the material.

A stress distribution of the light-transmissive structure cannot be detected in the existing art, and thereby a quality of the light-transmissive structure and a display effect of a display device cannot be effectively improved.

SUMMARY

The technical problem to be solved by the present disclosure is to provide a stress detection device for a light-transmissive structure and a detection method for the same, which can detect a stress distribution of the light-transmissive structure.

In order to solve the above technical problem, an embodiment of the present disclosure provides a stress detection device for the light-transmissive structure. The technical solution is as follows.

A stress detection device for a light-transmissive structure, including: a light source, a first polarizer, a light intensity distribution state detection unit and a stress distribution state analysis unit;

wherein the light source emits uniform polarized light; during detection, the first polarizer and the light sources are located at opposite sides of the light-transmissive structure, respectively; the light intensity distribution state detection unit is configured to obtain a light intensity distribution state of the polarized light emitted from the first polarizer; the stress distribution state analysis unit is configured to obtain a stress distribution state of the light-transmissive structure according to the light intensity distribution state.

Alternatively, the stress distribution state analysis unit is further used to analyze a reason why the light-transmissive structure has the stress distribution state.

Alternatively, the stress detection device for the light-transmissive structure further includes a real-time process parameter adjustment unit configured to adjust various process parameters for manufacturing the light-transmissive structure in real time, based on the reason which is analyzed by the stress distribution state analysis unit and why the light-transmissive structure has the stress distribution state.

Alternatively, the light source is a polarized light source emitting polarized light.

Alternatively, the light source includes a natural light source and a second polarizer.

Alternatively, a light-transmissive axis direction of the second polarizer and that of the first polarizer are arranged with a variety of angles.

Alternatively, the light-transmissive axis direction of the second polarizer is perpendicular to that of the first polarizer.

Alternatively, the stress detection device for the light-transmissive structure further includes an upper frame configured to fix the first polarizer, a carrying structure configured to carry the light-transmissive structure, a base configured to fix the upper frame, the first polarizer, the carrying structure and the light-transmissive structure.

Alternatively, the stress detection device for the light-transmissive structure further includes an upper frame configured to fix the first polarizer, a lower frame configured to fix the second polarizer, a carrying structure configured to carry the light-transmissive structure, a base configured to fix the upper frame, the first polarizer, the lower frame, the second polarizer, the carrying structure and the light-transmissive structure.

Alternatively, the carrying structure is a PET film with no stress therein.

Alternatively, a distance between the upper frame and the lower frame is adjustable.

Alternatively, the light-transmissive structure is transparent or semi-transparent.

An embodiment of the present disclosure provides a stress detection device for a light-transmissive structure, including a light source, a first polarizer, a light intensity distribution state detection unit and a stress distribution state analysis unit; wherein the light source emits uniform polarized light; during detection, the first polarizer and the light sources are located at opposite sides of the light-transmissive structure, respectively; the polarized light emitted from the light source passes through the light-transmissive structure and the first polarizer sequentially; the light intensity distribution state detection unit obtain a light intensity distribution state of the polarized light emitted from the first polarizer; the stress distribution state analysis unit obtain a stress distribution state of the light-transmissive structure according to the light intensity distribution state. Therefore, the stress detection device for the light-transmissive structure in the embodiment of the present disclosure can detect the stress distribution state of the light-transmissive structure, and thereby a quality of the light-transmissive structure and a display effect of a display device can be effectively improved.

In order to further solve the above technical problem, an embodiment of the present disclosure provides a stress detection method for a light-transmissive structure. The technical solution is as follows.

A stress detection method for a light-transmissive structure includes:

placing the light-transmissive structure between a light source and a first polarizer; emitting, by the light source, uniform polarized light;

obtaining, by a light intensity distribution state detection unit, a light intensity distribution state of the polarized light emitted from the first polarizer;

obtaining, by a stress distribution state analysis unit, a stress distribution state of the light-transmissive structure, according to the light intensity distribution state.

Alternatively, before the step of placing the light-transmissive structure between a light source and a first polarizer, the method further includes:

obtaining material and thickness information of the light-transmissive structure;

adjusting brightness of the light source according to the material and thickness information of the light-transmissive structure.

Alternatively, the stress detection method for a light-transmissive structure further includes:

analyzing, by the stress distribution state analysis unit, a reason why the light-transmissive structure has the stress distribution state.

Alternatively, the stress detection method for a light-transmissive structure further includes:

adjusting, by a real-time process parameter adjustment unit, various process parameters for manufacturing the light-transmissive structure in real time, based on the reason which is analyzed by the stress distribution state analysis unit and why the light-transmissive structure has the stress distribution state.

An embodiment of the present disclosure provides a stress detection method for a light-transmissive structure, including: placing the light-transmissive structure between the light source and the first polarizer; obtaining, by the light intensity distribution state detection unit, a light intensity distribution state of the polarized light emitted from the first polarizer; obtaining, by the stress distribution state analysis unit, a stress distribution state of the light-transmissive structure according to the light intensity distribution state. Therefore, the stress detection method for the light-transmissive structure in the embodiment of the present disclosure can detect the stress distribution state of the light-transmissive structure, and thereby a quality of the light-transmissive structure and a display effect of a display device can be effectively improved.

BRIEF DESCRIPTION OF THE DRAWINGS

In order to more clearly illustrate technical solutions in an embodiment of the present disclosure or in the prior art, the drawings to be required in the description of the embodiment will be described simply below. It is obvious that the drawings described below are only some embodiments of the present disclosure; other drawings can also be obtained according to these drawings for a person skilled in the art without creative work.

DETAILED DESCRIPTION

The technical solutions of embodiments of the present disclosure will be clearly and completely described in conjunction with the drawings of embodiments. It is obvious that the described embodiments are a part of embodiments of the present disclosure, but not all embodiments. Based on the embodiments of the present disclosure, all the other embodiments obtained by a person skilled in the art without creative work will fall within the protection scope of the present disclosure.

An embodiment of the present disclosure provides a stress detection device for a light-transmissive structure, which can detect a stress distribution state of the light-transmissive structure.

Figure 1:
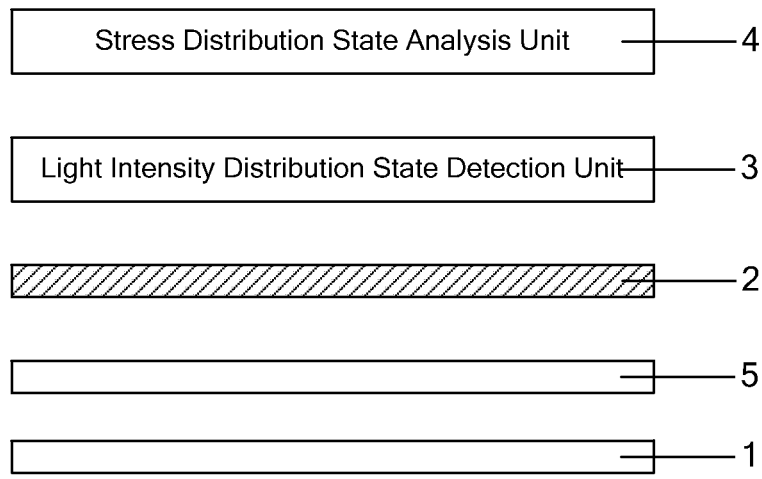
FIG. 1 is a schematic diagram showing a stress detection device for a first light-transmissive structure according to an embodiment of the present disclosure.

Specifically, as shown in FIG. 1, the stress detection device for the light-transmissive structure includes: a light source 1, a first polarizer 2, a light intensity distribution state detection unit 3 and a stress distribution state analysis unit 4.

The light source 1 emits uniform polarized light and brightness of the light source 1 can be adjusted according to a material and thickness information of the light-transmissive structure 5. During detection, the first polarizer 2 and the light source 1 are located on opposite sides of the light-transmissive structure 5, respectively. The light-transmissive structure 5 is parallel to planes where the first polarizer 2 and the light source 1 are located. The light intensity distribution state detection unit 3 is configured to obtain a light intensity distribution state of a polarized light emitted from the first polarizer 2. For example, the light intensity distribution state can be presented in a form of an image, and different light intensities can be presented by different colors in different regions. The stress distribution state analysis unit 4 is configured to obtain a stress distribution state of the light-transmissive structure 5 according to the light intensity distribution state. For example, the stress distribution state also can be presented in a form of an image, and different stresses can be presented by different colors in different regions.

The reasons for that the stress distribution state analysis unit 4 can obtain the stress distribution state of the light-transmissive structure 5 according to the light intensity distribution state is as follows. Since there are stresses in the light-transmissive structure 5 and densities of regions with different stresses in the light-transmissive structure 5 are different, when the uniform polarized light emitted by the light source 1 passes through the light-transmissive structure 5, intensities of the polarized light which passes through different regions of the light-transmissive structure 5 and then through the first polarizer 2 are different. For example, the greater stress a region in the light-transmissive structure 5 has, the greater density the region has, the smaller intensity the polarized light which passes through the region of the light-transmissive structure 5 and then through the first polarizer 2 has.

Alternatively, at the same time of obtaining the stress distribution state of the light-transmissive structure 5 according to the light intensity distribution state, the stress distribution state analysis unit 4 also can analyze the reason why the light-transmissive structure 5 has the above stress distribution state.

Figure 2:
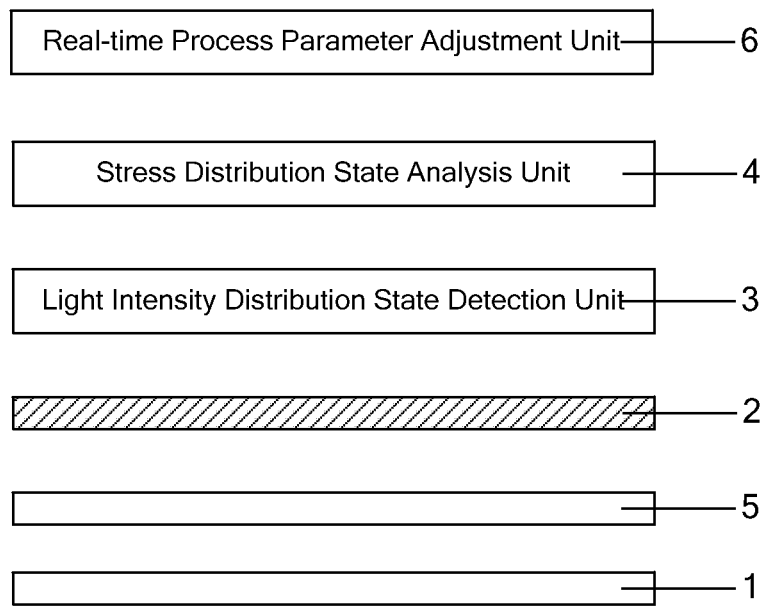
FIG. 2 is a schematic diagram showing a stress detection device for a second light-transmissive structure according to an embodiment of the present disclosure.

At this time, as shown in FIG. 2, the stress detection device for the light-transmissive structure may further include a real-time process parameter adjustment unit 6 configured to adjust various process parameters in real time during manufacturing the light-transmissive structure 5, based on the reason which is analyzed by the stress distribution state analysis unit 4 and why the light-transmissive structure 5 has the above stress distribution state.

The above-described stress detection device for the light-transmissive structure has a number of advantages in practical applications. In order to facilitate those skilled in the art to understand, an embodiment of the present disclosure takes a light guide plate as an example of the light-transmissive structure to describe a specific application process of the stress detection device for the light-transmissive structure as follows.

First, a simulation is performed by using software, such as MoldFlow, to initially set a series of process parameters for manufacturing the light guide plate, and then a light guide plate sample is manufactured according to these parameters.

Then, the light-transmissive structure 5 is placed between the light source 1 and the first polarizer 2. The light intensity distribution state detection unit 3 obtains the light intensity distribution state of the polarized light emitted from the first polarizer 2. The stress distribution state analysis unit 4 obtains the stress distribution state of the light-transmissive structure 5 according to the light intensity distribution state, and analyzes the reason why the light guide plate sample has the above stress distribution state.

Finally the real-time process parameter adjustment unit 6 adjusts various process parameters for manufacturing the light guide plate in real time according to the above reason, such as an injection speed of the material in the molten state, a mold temperature, an opening size and location of a mold, or the like, and thereby optimum process parameters for manufacturing the light guide plate is summarized and a mass production of the light guide plate is performed according to the above optimum process parameters.

Alternatively, during summarizing the optimum process parameters for manufacturing the light guide plate, a limit sample can also be set up in advance and a stress distribution state of the limit sample is detected. Then a stress distribution state of a light guide plate sample to be tested is compared with that of the limit sample. If the stress distribution state of the light guide plate sample to be tested does not meet specifications, the stress distribution state analysis unit 4 analyzes the reason, and the real-time process parameter adjustment unit 6 adjusts the process parameters in real time; otherwise, if the stress distribution state of the testing light guide plate sample meets specifications, a mass production of the light guide plate is performed.

Further, the light-transmissive structure 5 described in the embodiment of the present disclosure is not limited to a light guide plate, but can be all the structures as long as the structures can allow light to pass through. The light-transmissive structure 5 can be transparent or semi-transparent. For example, the light-transmissive structure 5 can be a light guide plate or a glass substrate or the like.

Figure 3:
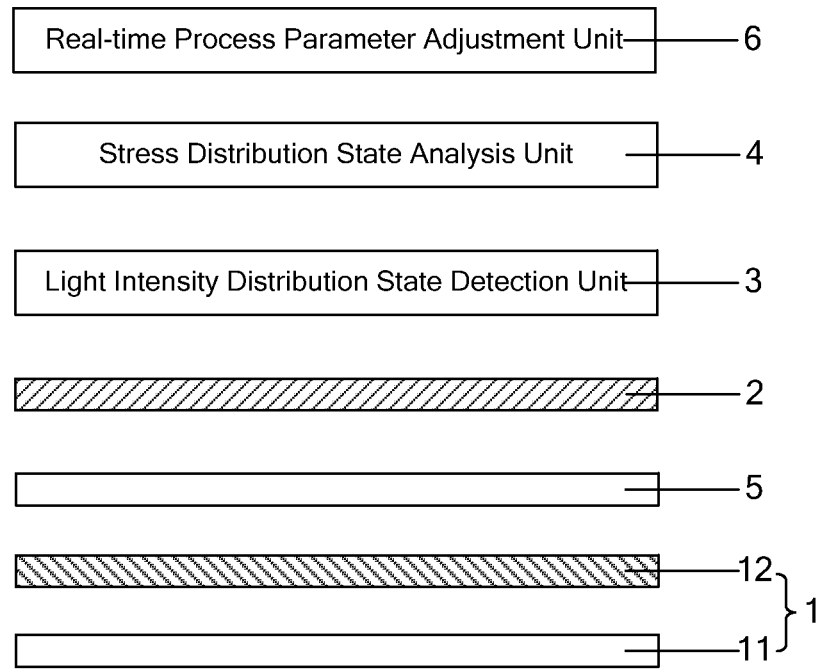
FIG. 3 is a schematic diagram showing a stress detection device for a third light-transmissive structure according to an embodiment of the present disclosure.

Specifically, the light source 1 may be a polarized light source emitting polarized light; or, as shown in FIG. 3, the light source 1 may also include a natural light source 11 and a second polarizer 12. After passing through the second polarizer 12, natural light emitted from the nature light source 11 is changed into polarized light. When the light source 1 includes the natural light source 11 and the second polarizer 12, a light-transmissive axis direction of the second polarizer 12 and that of the first polarizer 2 can be arranged with a variety of angles. When the light-transmissive axis direction of the second polarizer 12 is perpendicular to that of the first polarizer 2, there should be no light passing through the first polarizer 2 theoretically, but in fact there is a little polarized light passing through the first polarizer 2. In this case, the influence of stresses in the light-transmissive structure 5 on the light intensity of polarized light passing through the first polarizer 2 is most obvious. Therefore, in the embodiment of the present disclosure, it is preferred that the light-transmissive axis direction of the second polarizer 12 is perpendicular to that of the first polarizer 2.

Figure 4:
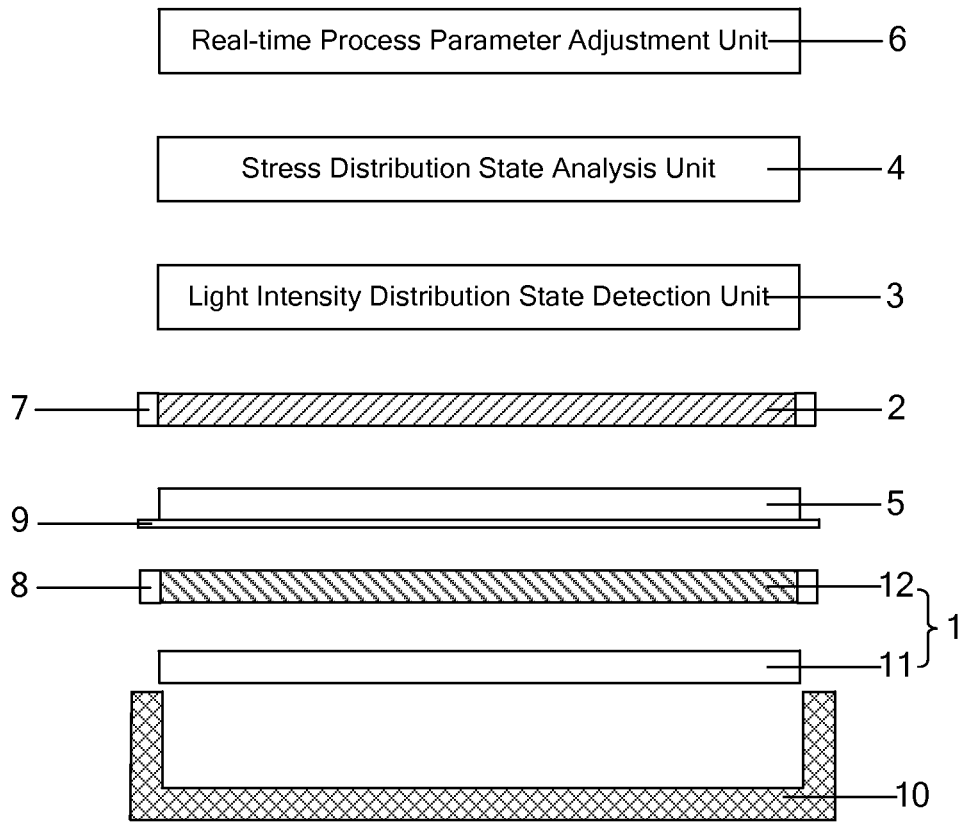
FIG. 4 is a schematic diagram showing a stress detection device for a forth light-transmissive structure according to an embodiment of the present disclosure.

Additionally, as shown in FIG. 4, the stress detection device for the light-transmissive structure further includes an upper frame 7 configured to fix the first polarizer 2, a lower frame 8 configured to fix the second polarizer 12, a carrying structure 9 configured to carry the light-transmissive structure 5, a base 10 configured to fix the upper frame 7, the first polarizer 2, the lower frame 8, the second polarizer 12 and the carrying structure 9, wherein the carrying structure 9 is a PET film with no stress therein, and the carrying structure 9 can carry light-transmissive structures 5 having different sizes and/or different materials. Further, in order to make the stress detection device for the light-transmissive structure in the embodiment of the present disclosure be able to detect the stress distribution states of the light-transmissive structures 5 with different thicknesses, in the embodiment of the present disclosure, a distance between the upper frame 7 and the lower frame 8 is adjustable. For example, the distance can be adjusted in a manner of adjusting a screw by a power apparatus or an operator.

An embodiment of the present disclosure provides a stress detection device for a light-transmissive structure, including a light source, a first polarizer, a light intensity distribution state detection unit and a stress distribution state analysis unit; wherein the light source emits uniform polarized light; during detection, the first polarizer and the light sources are located at opposite sides of the light-transmissive structure, respectively; the polarized light emitted from the light source passes through the light-transmissive structure and the first polarizer sequentially; the light intensity distribution state detection unit obtain a light intensity distribution state of the polarized light emitted from the first polarizer; the stress distribution state analysis unit obtains a stress distribution state of the light-transmissive structure according to the light intensity distribution state. Therefore, the stress detection device for the light-transmissive structure in the embodiment of the present disclosure can detect the stress distribution state of the light-transmissive structure, and thereby a quality of the light-transmissive structure and a display effect of a display device can be effectively improved.

Figure 5:
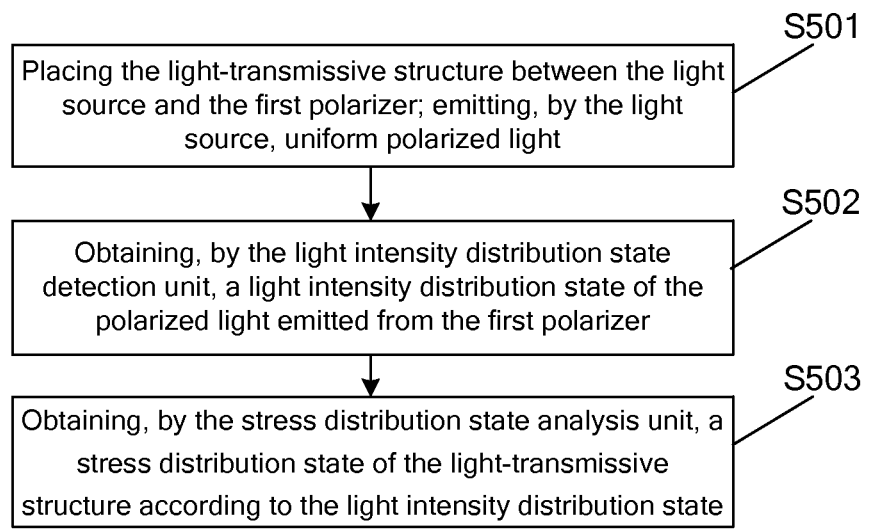
FIG. 5 is a flowchart showing a stress detection method for a light-transmissive structure according to an embodiment of the present disclosure.

An embodiment of the present disclosure further provides a stress detection method for a light-transmissive structure. As shown in FIG. 5, the stress detection method includes:

Step S501, placing the light-transmissive structure between a light source and a first polarizer; emitting, by the light source, uniform polarized light.

In order to obtain more accurate results, in an embodiment of the present disclosure, before the step of placing the light-transmissive structure 5 between the light source 1 and the first polarizer 2, the method further includes: firstly, obtaining material and thickness information of the light-transmissive structure 5; and then adjusting brightness of the light source 1 according to the material and thickness information of the light-transmissive structure 5.

Step S502, obtaining, by a light intensity distribution state detection unit, a light intensity distribution state of the polarized light emitted from the first polarizer.

For example, the light intensity distribution state can be presented in a form of an image, and different light intensities can be presented by different colors in different regions.

Step S503, obtaining, by a stress distribution state analysis unit, a stress distribution state of the light-transmissive structure according to the light intensity distribution state.

For example, the stress distribution state also can be presented in a form of an image, and different stresses can be presented by different colors in different regions.

Further, the stress detection method for a light-transmissive structure also includes: analyzing, by the stress distribution state analysis unit 4, a reason why the light-transmissive structure 5 has the stress distribution state.

Further, the stress detection method for a light-transmissive structure also includes: adjusting, by a real-time process parameter adjustment unit 6, various process parameters for manufacturing the light-transmissive structure 5 in real time, based on the reason which is analyzed by the stress distribution state analysis unit 4 and why the light-transmissive structure 5 has the above stress distribution state.

An embodiment of the present disclosure provides a stress detection method for a light-transmissive structure, including: placing the light-transmissive structure between a light source and a first polarizer; obtaining, by a light intensity distribution state detection unit, a light intensity distribution state of the polarized light emitted from the first polarizer; obtaining, by a stress distribution state analysis unit, a stress distribution state of the light-transmissive structure according to the light intensity distribution state. Therefore, the stress detection device for the light-transmissive structure in the embodiment of the present disclosure can detect the stress distribution state of the light-transmissive structure, and thereby a quality of the light-transmissive structure and a display effect of a display device can be effectively improved.

The above are only preferred embodiments of the present disclosure, the scope of the present disclosure is not limited thereto. All the modifications and alterations which can be easily thought by a person skilled in the art and within the technical scope of the present disclosure should fall in the protection scope of the present disclosure. Accordingly, the protection scope of the present disclosure should be defined by the claims.

What is claimed is:

1. A stress detection device for a light-transmissive structure, comprising: a light source, a first polarizer, a light intensity distribution state detection unit, a stress distribution state analysis unit, and a real-time process parameter adjustment unit;

wherein the light source emits uniform polarized light; during detection, the first polarizer and the light sources are located at opposite sides of the light-transmissive structure, respectively; the light intensity distribution state detection unit is configured to obtain a light intensity distribution state of the polarized light emitted from the first polarizer; the stress distribution state analysis unit is configured to obtain a stress distribution state of the light-transmissive structure according to the light intensity distribution state, wherein, the stress distribution state analysis unit is further used to analyze a reason why the light-transmissive structure has the stress distribution state, and wherein the real-time process parameter adjustment unit is configured to adjust various process parameters for manufacturing the light-transmissive structure in real time, based on the reason why the light-transmissive structure has the stress distribution state, which is analyzed by the stress distribution state analysis unit.

2. The stress detection device for the light-transmissive structure according to claim 1, wherein, the light source is a polarized light source emitting polarized light.

3. The stress detection device for the light-transmissive structure according to claim 1, wherein, the light source comprises a natural light source and a second polarizer.

4. The stress detection device for the light-transmissive structure according to claim 3, wherein, a light-transmissive axis direction of the second polarizer and a light-transmissive axis direction of the first polarizer are arranged with a variety of angles.

5. The stress detection device for the light-transmissive structure according to claim 4, wherein, the light-transmissive axis direction of the second polarizer is perpendicular to the light-transmissive axis direction of the first polarizer.

6. The stress detection device for the light-transmissive structure according to claim 2, further comprising an upper frame configured to fix the first polarizer, a carrying structure configured to carry the light-transmissive structure, a base configured to fix the upper frame, the first polarizer, the carrying structure and the light-transmissive structure.

7. The stress detection device for the light-transmissive structure according to claim 3, further comprising an upper frame configured to fix the first polarizer, a lower frame configured to fix the second polarizer, a carrying structure configured to carry the light-transmissive structure, a base configured to fix the upper frame, the first polarizer, the lower frame, the second polarizer, the carrying structure and the light-transmissive structure.

8. The stress detection device for the light-transmissive structure according to claim 6, wherein, the carrying structure is a PET film with no stress therein.

9. The stress detection device for the light-transmissive structure according to claim 7, wherein, the carrying structure is a PET film with no stress therein.

10. The stress detection device for the light-transmissive structure according to claim 7, wherein, a distance between the upper frame and the lower frame is adjustable.

11. The stress detection device for the light-transmissive structure according to claim 1, wherein, the light-transmissive structure is transparent or semi-transparent.

12. A stress detection method for a light-transmissive structure, comprising:
placing the light-transmissive structure between a light source and a first polarizer; emitting, by the light source, uniform polarized light;
obtaining, by a light intensity distribution state detection unit, a light intensity distribution state of the polarized light emitted from the first polarizer; and
obtaining, by a stress distribution state analysis unit, a stress distribution state of the light-transmissive structure, according to the light intensity distribution state,
wherein, before the step of placing the light-transmissive structure between the light source and the first polarizer, the method further comprises:
obtaining material and thickness information of the light-transmissive structure; and
adjusting a brightness of the light source according to the material and thickness information of the light-transmissive structure.

13. A stress detection method for a light-transmissive structure, comprising:
placing the light-transmissive structure between a light source and a first polarizer; emitting, by the light source, uniform polarized light;

obtaining, by a light intensity distribution state detection unit, a light intensity distribution state of the polarized light emitted from the first polarizer;

obtaining, by a stress distribution state analysis unit, a stress distribution state of the light-transmissive structure, according to the light intensity distribution state;

analyzing, by the stress distribution state analysis unit, a reason why the light-transmissive structure has the stress distribution state; and adjusting, by a real-time process parameter adjustment unit, various process parameters for manufacturing the light-transmissive structure in real time, based on the reason why the light-transmissive structure has the stress distribution state, which is analyzed by the stress distribution state analysis unit.

14. The stress detection method for a light-transmissive structure according to claim 13, further comprising:

adjusting, by a real-time process parameter adjustment unit, various process parameters for manufacturing the light-transmissive structure in real time, based on the reason which is analyzed by the stress distribution state analysis unit and why the light-transmissive structure has the stress distribution state.

15. The stress detection device for the light-transmissive structure according to claim 1, wherein the reason is that densities of regions with different stresses in the light-transmissive structure are different.

16. The stress detection device for the light-transmissive structure according to claim 1, wherein the process parameters comprise an injection speed of a material of the light-transmissive structure in a molten state, a mold temperature, an opening size, location of a mold or any combination thereof.

* * * * *